US008909577B2

(12) United States Patent
Heliot et al.

(10) Patent No.: US 8,909,577 B2
(45) Date of Patent: Dec. 9, 2014

(54) DEVICE AND METHOD FOR NEUROMORPHIC DATA PROCESSING USING SPIKING NEURONS

(75) Inventors: Rodolphe Heliot, Grenoble (FR); Marc Duranton, Orsay (FR); Antoine Joubert, Grenoble (FR)

(73) Assignee: Commissariat à l'énergie et aux énergies alternatives, Paris (FR)

( * ) Notice: Subject to any disclaimer, the term of this patent is extended or adjusted under 35 U.S.C. 154(b) by 229 days.

(21) Appl. No.: 13/549,990

(22) Filed: Jul. 16, 2012

(65) Prior Publication Data
US 2013/0185237 A1    Jul. 18, 2013

(30) Foreign Application Priority Data

Jul. 21, 2011   (FR) ..................................... 11 56648

(51) Int. Cl.
G06F 15/18 (2006.01)
G06J 1/00 (2006.01)
G06N 3/00 (2006.01)
G06G 7/00 (2006.01)
G06N 3/02 (2006.01)
G06N 3/063 (2006.01)

(52) U.S. Cl.
CPC . *G06N 3/02* (2013.01); *G06N 3/063* (2013.01)
USPC ............................................. 706/33; 706/38

(58) Field of Classification Search
None
See application file for complete search history.

(56) References Cited

U.S. PATENT DOCUMENTS

| 8,345,984 | B2 * | 1/2013 | Ji et al. ........................... 382/190 |
| 2010/0241601 | A1 * | 9/2010 | Carson et al. .................... 706/27 |
| 2010/0277232 | A1 * | 11/2010 | Snider ............................ 327/565 |
| 2011/0004579 | A1 * | 1/2011 | Snider ............................. 706/25 |
| 2011/0119214 | A1 * | 5/2011 | Breitwisch et al. .............. 706/33 |
| 2012/0084240 | A1 * | 4/2012 | Esser et al. ....................... 706/27 |
| 2012/0084241 | A1 * | 4/2012 | Friedman et al. ............... 706/27 |
| 2012/0109864 | A1 * | 5/2012 | Modha ............................ 706/25 |

OTHER PUBLICATIONS

Campardo, Giovanni, Giancarlo Ripamonti, and Rino Micheloni. "3-D Integration Technologies [Scanning the Issue]." Proceedings of the IEEE 97.1 (2009): 5-8.*
Boahen, Kwabena A. "A burst-mode word-serial address-event link-I: Transmitter design." Circuits and Systems I: Regular Papers, IEEE Transactions on 51.7 (2004): 1269-1280.*

(Continued)

*Primary Examiner* — Kakali Chaki
*Assistant Examiner* — Daniel Pellett
(74) *Attorney, Agent, or Firm* — Oblon, Spivak, McClelland, Maier & Neustadt, L.L.P.

(57) ABSTRACT

A neuromorphic data processing device comprising a plurality of spiking neurons, with each of these neurons comprising: an integrator designed to receive successive analog pulses each having a certain value, and accumulate the values of the pulses received in a recorded value, referred to as accumulation value, and a discharger designed to emit a pulse, referred to as discharge pulse, according to the accumulation value, and a silicon support having two surfaces, the neurons being carried out on at least one of the two surfaces, the integrator of each neuron comprising a metal via of the TSV type between the two surfaces of the silicon support, the metal via of the TSV type forming a capacitor with the silicon support and having an electric potential forming the accumulation value wherein the values of the pulses received are accumulated and according to which the discharge pulse is emitted.

11 Claims, 2 Drawing Sheets

(56) References Cited

OTHER PUBLICATIONS

Boahen, Kwabena A. "A burst-mode word-serial address-event link-II: Receiver design." Circuits and Systems I: Regular Papers, IEEE Transactions on 51.7 (2004): 1281-1291.*

Boahen, Kwabena A. "A burst-mode word-serial address-event Link-III: Analysis and test results." Circuits and Systems I: Regular Papers, IEEE Transactions on 51.7 (2004): 1292-1300.*

Maier, Klaus D., et al. "A multi-layer-perceptron neural network hardware based on 3D massively parallel optoelectronic circuits." Parallel Interconnects, 1999.(PI'99) Proceedings. The 6th International Conference on. IEEE, 1999.*

Giulioni, M., et al. "A VLSI network of spiking neurons with plastic fully configurable "stop-learning" synapses." Electronics, Circuits and Systems, 2008. ICECS 2008. 15th IEEE International Conference on. IEEE, 2008.*

Heittmann, Arne, et al. "An analog VLSI pulsed neural network for image segmentation using adaptive connection weights." Artificial Neural Networks-ICANN 2002. Springer Berlin Heidelberg, 2002. 1293-1298.*

Schreiter, Jörg, et al. "Analog implementation for networks of integrate-and-fire neurons with adaptive local connectivity." Proceedings of the 2002 12th IEEE Workshop on Neural Networks for Signal Processing. 2002.*

Indiveri, Giacomo, Elisabetta Chicca, and Rodney J. Douglas. "Artificial cognitive systems: from VLSI networks of spiking neurons to neuromorphic cognition." Cognitive Computation 1.2 (2009): 119-127.* van Schaik, André. "Building blocks for electronic spiking neural networks." Neural networks 14.6 (2001): 617-628.*

Schreiter, Juerg, et al. "Cellular pulse-coupled neural network with adaptive weights for image segmentation and its VLSI implementation." Electronic Imaging 2004. International Society for Optics and Photonics, 2004.*

Hsu, Ku-Teng, et al. "Design of reflectionless vias using neural network-based approach." Advanced Packaging, IEEE Transactions on 31.1 (2008): 211-218.*

Vogelstein, R. Jacob, et al. "Dynamically reconfigurable silicon array of spiking neurons with conductance-based synapses." Neural Networks, IEEE Transactions on 18.1 (2007): 253-265.*

Heittmann, Arne, and Ulrich Ramacher. "Electrical Performance of 3D Circuits." Handbook of 3D Integration: Technology and Applications of 3D Integrated Circuits (2008): 599-621.*

Soorya Krishna, K.; Bhat, M. S., "Impedance matching for the reduction of via induced signal reflection in on-chip high speed interconnect lines," Communication Control and Computing Technologies (ICCCCT), 2010 IEEE International Conference on , vol., No., pp. 120,125, Oct. 7-9, 2010.*

Munding, Andreas. Interconnect technology for three-dimensional chip integration. Cuvillier Verlag, 2007.*

Renaud, Sylvie, et al. "Neuromimetic ICs with analog cores: an alternative for simulating spiking neural networks." Circuits and Systems, 2007. ISCAS 2007. IEEE International Symposium on. IEEE, 2007.*

Koyanagi, Mitsumasa, et al. "Neuromorphic vision chip fabricated using three-dimensional integration technology." Solid-State Circuits Conference, 2001. Digest of Technical Papers. ISSCC. 2001 IEEE International. IEEE, 2001.*

Boahen, Kwabena A. "Point-to-point connectivity between neuromorphic chips using address events." Circuits and Systems II: Analog and Digital Signal Processing, IEEE Transactions on 47.5 (2000): 416-434.*

Zou, Quan, et al. "Real-time simulations of networks of Hodgkin-Huxley neurons using analog circuits." Neurocomputing 69.10 (2006): 1137-1140.*

Matolin, Daniel, et al. "Simulation and implementation of an analog VLSI pulse-coupled neural network for image segmentation." MWSCAS: Midwest symposium on circuits and systems. 2004.*

Schemmel, Johannes, Johannes Fieres, and Karlheinz Meier. "Wafer-scale integration of analog neural networks." Neural Networks, 2008. IJCNN 2008.(IEEE World Congress on Computational Intelligence). IEEE International Joint Conference on. IEEE, 2008.*

Sivilotti, Massimo Antonio. Wiring considerations in analog VLSI systems, with application to field-programmable networks. Diss. California Institute of Technology, 1990.*

French Preliminary Search Report and Written Opinion issued Mar. 1, 2012 in corresponding French Application No. 11 56648 filed on Jul. 21, 2011 (with an English Translation of Categories).

Bernard Courtois, "Integrated Circuit Brokers: Where do they come from? Where are they heading?", The 20th International Conference on Microelectronics (ICM '08), Dec. 14, 2008, XP 055019837, 12 Pages.

Arne Heittmann et al., "Chapter 31: Electrical Performance of 3D Circuits", Handbook of 3D Integration: Technology and Applications of 3D Integrated Circuits, Nov. 25, 2008, XP 055019842, pp. 599-621.

A. Munding, "Chapter 1: Introduction", Interconnect Technology for Three-Dimensional Chip Integration, Oct. 25, 2007, XP 055019860, pp. 1-18 and 109-112.

\* cited by examiner

DEVICE AND METHOD FOR NEUROMORPHIC DATA PROCESSING USING SPIKING NEURONS

BACKGROUND OF THE INVENTION

The invention can for example be implemented in a high-density neuromorphic circuit for the emulation of large biological neural networks, such as those described in the following publications:

"Wafer-scale integration of analog neural networks", by J. Schemmel, J. Fieres, and K. Meier, IJCNN, 2008, and "Dynamically reconfigurable silicon array of spiking neurons with conductance-based synapses", by Vogelstein R J, Mallik U, Vogelstein J T and Cauwenberghs G., IEEE Transactions on Neural Networks, 2007, 18(1): 253-265.

The invention can furthermore for example be implemented in a high-density neuromorphic circuit for signal processing applications (image, video, audio), classification via learning, intelligent retina.

Other applications are possible.

The invention in particular relates to "spiking neurons". These neurons are basic processing circuits intended to be linked, which behave as temporal integrators with leakage. Their internal potential reflects the sum of the various positive or negative inputs received with the passing of time, subjected to a leakage often modelled by a constant leakage current. When the internal potential of the neuron reaches a certain threshold, the neuron signals this event via a logic and electrical event of short duration (equivalent to an action potential for the biological neuron). Its internal potential then returns to its idle value, on standby for future new contributions of inputs. This logic event will in turn, through the intermediary of its electrical manifestation, generate an input in the post-synaptic neurons connected to the source neuron.

However, an analogue spiking neuron requires a large-size capacitor element (capacitance of a magnitude of 500 fF) in order to carry out the temporal integration of the weighted input signals, which consumes substantial silicon surface.

DESCRIPTION OF THE PRIOR ART

There are many examples of implementations on silicon of analogue "spiking" neurons, for example:

"Building blocks for electronic spiking neural networks" by A. van Schaik, published in Neural networks, 2001, 14(6-7):617-28, and "Real-time simulations of networks of Hodgkin-Huxley neurons using analog circuits" by Zou Q., Bornat Y., Tomas J., Renaud S. and Destexhe A., published in Neurocomputing, 2006, 69(10-12):1137-1140.

Each of these publications as such describes a data processing device, comprising a plurality of basic data processing units, referred to as neurons, with each of these neurons comprising: an integrator designed to receive successive analogue pulses each having a certain value, and accumulate the values of the pulses received in a recorded value, referred to as accumulation value, and a discharger designed to emit a pulse, referred to as discharge pulse, according to the accumulation value. In practice, in the aforementioned documents, the neurons are carried on a surface of a support.

In these publications, two major options are conventionally available in order to carry out a capacitance:

capacitors of the MIM ("Metal Insulator Metal") type wherein the capacitor is created between two levels of metal interconnections capacitors of the MOS type: the capacitor is created around a transistor gate In both cases, these elements require a substantial surface of silicon, the order of magnitude of which is 1 µm² for 5 fF. However, as indicated previously, the analogue spiking neurons require a capacitance of a magnitude of 500 fF, which corresponds to a surface of silicon of a magnitude of 100 µm², which gives rise to problems of encumbrance in particular when the number of neurons is substantial.

It can thus be sought to provide a data processing device that makes it possible to overcome at least part of the aforementioned problems and constraints.

SUMMARY OF THE INVENTION

The invention therefore covers any neuromorphic data processing device comprising a plurality of spiking neurons, with each one of these neurons comprising: an integrator designed to receive successive analogue pulses each having a certain value, and accumulate the values of the pulses received in a recorded value, referred to as accumulation value, and a discharger designed to emit a pulse, referred to as discharge pulse, according to the accumulation value, and a silicon support having two surfaces, the neurons being carried out on at least one of the two surfaces, the integrator of each neuron comprising a metal via of the TSV type between the two surfaces of the silicon support, the metal via of the TSV type forming a capacitor with the silicon support and having an electric potential forming the accumulation value wherein the values of the pulses received are accumulated and according to which the discharge pulse is emitted.

The TSVs ("Through-Silicon Vias") make it possible to connect together two integrated circuits carried by two separate planes of a silicon substrate, generally the upper and lower surfaces of the silicon substrate. The TSVs comprise metal vias drilled through the silicon substrate of the upper integrated circuit and connected to a metallisation of the lower integrated circuit. The terms "vertical interconnection" shall also be used in what follows to designate a TSV.

The magnitudes of the dimensions of a TSV are:
diameter between 5 and 20 µm,
spacing between 20 and 100 µm, and
length between 25 and 120 µm.

Moreover, TSVs have a high parasitic capacitance with the substrate, of a magnitude of 500 fF/100 µm in length.

The capacitor of a TSV is viewed in current developments as a nuisance that must be reduced as much as possible. Furthermore, the capacitor of a TSV has a value which is susceptible to vary substantially.

Nevertheless, thanks to the invention, this capacitor is made use of in the integrator of the neurons in order to allow for a 3D architecture of the neurons. The inventors indeed found that the variability of the value of the capacitor was not an obstacle in that the neural networks are tolerant by construction to the design variations in the material, and therefore among others to the value of the integration capacitance. In addition, the dispersion of the characteristics between neurons can be offset by a modification of the synaptic weights, either explicitly, or automatically during a learning phase.

This use of TSVs makes it possible to reduce the size of the neurons and to create the dense integration of analogue circuits which require high capacitance, for example in order to carry out integration functions.

Thanks to the invention, it is no longer required to use a MIM or MOS capacitor.

Optionally, the neuromorphic data processing device further comprises a pulse propagator designed to:

emit analogue pulses to at least one of the neurons using input data, and receive the discharge pulses, and, for each discharge pulse received, according to the neuron that has emitted it: either emit output data from the device using the discharge pulse, or convert the discharge pulse into at least one analogue pulse, referred to as propagated analogue pulse, and emit each propagated analogue pulse to one of the neurons.

Also optionally, the pulse propagator comprises at least one portion located on a first of the two surfaces, referred to as top surface, and the discharger of each neuron is located on the other of the two surfaces, referred to as bottom surface, with the processing device further comprising connections extending over the top surface and connecting this portion of the pulse propagator to the metal via of the TSV type of each neuron, and connections extending over the bottom surface and connecting the metal via of the TSV type of each neuron to the discharger of this neuron.

Also optionally, the pulse propagator comprises at least one metal via of the TSV type provided to transmit information from the bottom surface to the top surface.

Also optionally, the metal via or vias of the TSV type of the pulse propagator as well as the metal vias of the TSV type of the neurons are manufactured according to the same method of manufacture.

Also optionally, the pulse propagator further comprises:

an encoder designed to encode the discharge pulses into digital discharge pulses in such a way that each digital discharge pulse represents an identifier of the neuron that has emitted the discharge pulse, and a data bus connecting the encoder to the metal via of the TSV type of the pulse propagator.

Also optionally, the integrator of each neuron is furthermore designed to decrease the accumulation value over the course of time.

Also optionally, the discharger of each neuron is furthermore designed to reinitialise the accumulation value to a certain value at each emission of a discharge pulse.

Also optionally, the discharge pulses are constant potential pulses.

Also optionally, each discharger comprises a comparator to compare the accumulation value with a reference value, and a reference metal via of the TSV type designed to offset the ground variations that the metal via of the TSV type and the comparator can be subjected to.

The invention furthermore covers any neuromorphic method for data processing comprising:

receiving successive analogue pulses each having a certain value, accumulating the values of the pulses received in a recorded value, referred to as accumulation value, and emitting a pulse, referred to as discharge pulse, according to the accumulation value, the successive analogue pulses being received and accumulated in a metal via of the TSV type between two surfaces of a silicon support, the metal via of the TSV type forming a capacitor with the silicon support and having an electric potential forming the accumulation value wherein the values of the pulses received are recorded and according to which the discharge pulse is emitted.

BRIEF DESCRIPTION OF THE DRAWINGS

Example embodiments of the invention shall now be described, referring to the annexed drawings wherein.

DESCRIPTION OF THE PREFERRED EMBODIMENTS

The data processing device described in what follows is based on a solution that appeared in the 1990s in order to make it possible to have available a high number of programmable interconnections between spiking neurons. This solution is for example described in:

"Wiring considerations in analog VLSI systems, with application to field-programmable networks" by M. Sivilotti, Ph.D., California Inst. Technol., Pasadena, Calif., 1991, "Point-to-point connectivity between neuromorphic chips using address events" by K. Boahen, published in IEEE Transactions on Circuits and Systems II: Analog and Digital Signal Processing, 47(5):416-434, May 2000.

This solution, referred to as "Address-Event Representation" (AER), uses "virtual" connections rather than physical connections and was originally developed for connections between two neurons, and was later extended to connections between one neuron and several neurons. This extension is for example described in:

"A burst-mode word-serial address-event link-I-III" by Boahen, K. A., published in Circuits and Systems I: Regular Papers, IEEE Transactions on, vol. 51, no. 7, pp. 1269-1300, July 2004, doi: 10.1109/TCSI.2004.830703, "Dynamically reconfigurable silicon array of spiking neurons with conductance-based synapses" by Vogelstein R. J., Mallik U., Vogelstein J. T. and Cauwenberghs G., published in IEEE Transactions on Neural Networks, 2007, 18(1): 253-265.

Figure 1:
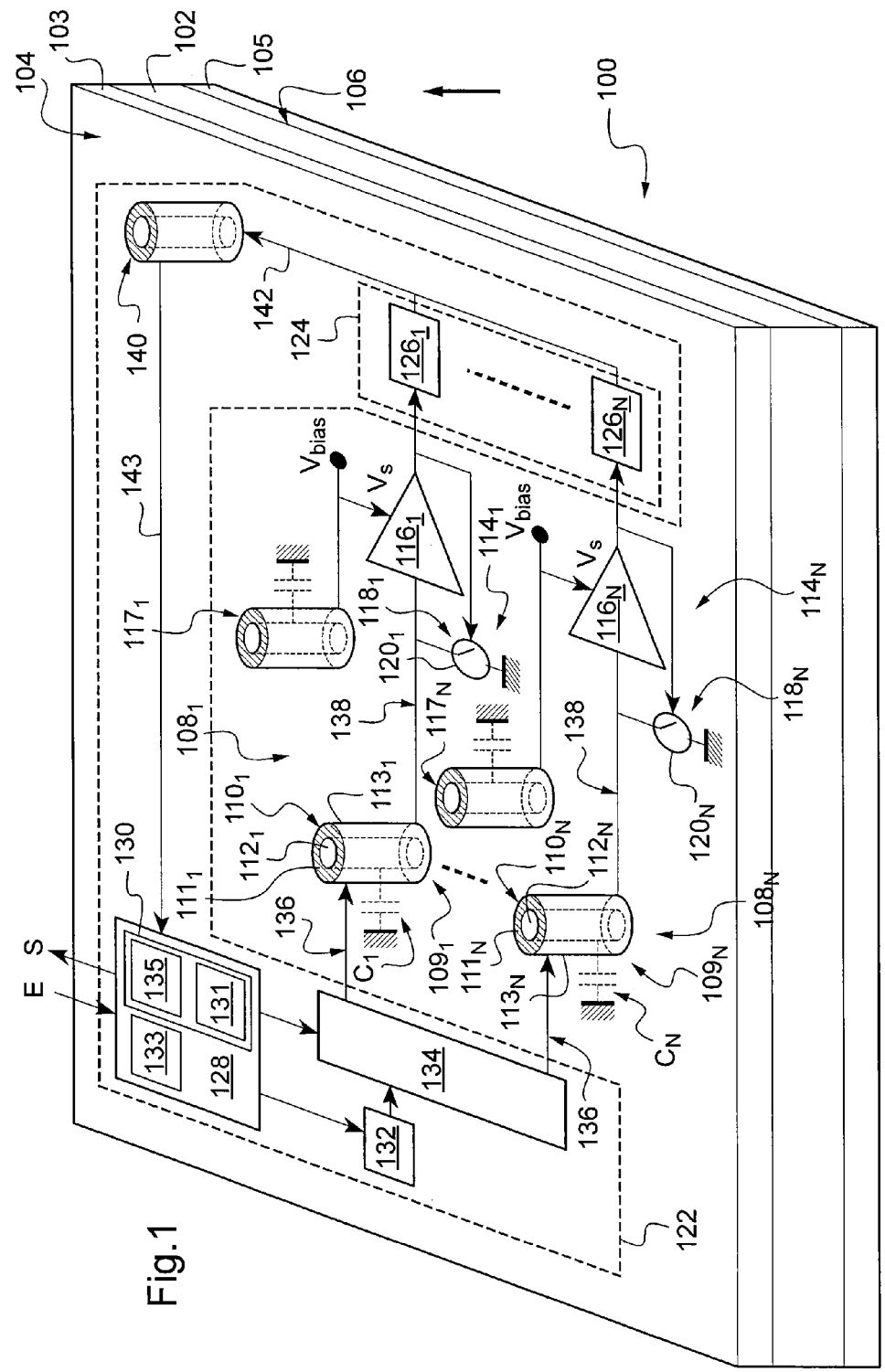
FIG. 1 is a simplified view in three dimensions of a neuromorphic data processing device implementing the invention.
Figure 4:
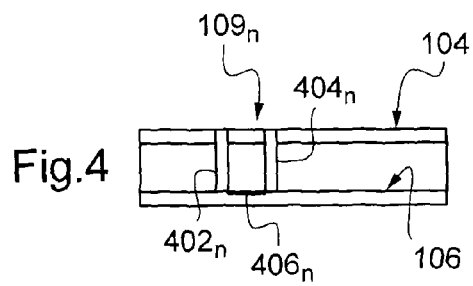
Figure 5:
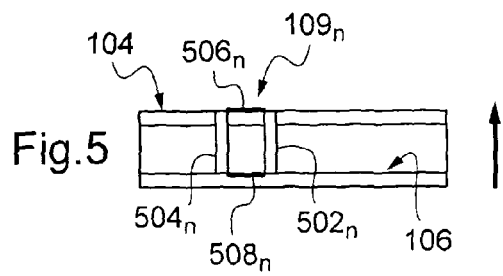

In the description that shall follow, the adjectives for positioning elements such as "top", "bottom", "upper", "lower", etc., refer to an arbitrary oriented axis, shown by an arrow in FIGS. 1, 4 and 5.

In reference to FIG. 1, a data processing device 100 implementing the invention comprises first of all a substrate 102 which is, in the example described, a rough layer of silicon ("Si Bulk"), having two opposite sides, an upper side and a lower side.

The data processing device 100 further comprises a first functionalised layer of silicon 103 on the upper side of the rough layer of silicon forming silicon substrate 102. The first functionalised layer of silicon 103 is referred to in what follows as top layer. The top layer of silicon 103 has an upper surface 104 directed towards the opposite of the rough layer of silicon forming silicon substrate 102, with this surface being referred to in what follows as top surface 104. In the example described, the layers 102 and 103 are formed in the same overall layer of silicon.

The data processing device 100 further comprises a second functionalised layer of silicon 105 on the lower side of the rough layer of silicon forming silicon substrate 102. The second functionalised layer of silicon 105 is referred to in what follows as bottom layer. The bottom layer of silicon 105 has an upper surface 106 directed towards the rough layer of silicon formant silicon substrate 102, this surface being referred to in what follows as bottom surface 106. In the example described, the layer 105 is separate from the overall layer of silicon forming the layers 102 and 103, and added to this overall layer.

Note that the surfaces 104, 106 are parallel to one another.

The data processing device 100 then comprises a plurality of basic data processing units, referred to as neurons $108_1 \ldots 108_N$.

The silicon substrate 102 and the portions of the layers of silicon 103, 105, which do not form electric components, in particular those that shall be described in what follows, thus form a silicon support having the two surfaces 104, 106 by which the neurons $108_1 \ldots 108_N$ are carried, i.e. on at least one of which the neurons are carried out, as shall be described in what follows.

Each of the neurons $108_1 \ldots 108_N$ comprises first of all an integrator $109_1 \ldots 109_N$ based on vertical interconnection (i.e. TSV). In the data processing device 100 described, the integrator $109_1 \ldots 109_N$ comprises a single vertical interconnection, referred to as accumulation vertical interconnection $110_1 \ldots 110_N$, between the two surfaces 104, 106.

More precisely, each accumulation vertical interconnection $110_1 \ldots 110_N$ comprises a conductive material $112_1 \ldots 112_N$ (the metal via) arranged in a perforation $113_1 \ldots 113_N$ passing through the silicon substrate 102, and the walls of which are covered with an insulating material $111_1 \ldots 111_N$. Each accumulation vertical interconnection $110_1 \ldots 110_N$ thus has an end on the top surface 104, referred to as upper end, and an end on the bottom surface 106, referred to as lower end. Each accumulation vertical interconnection $110_1 \ldots 110_N$ is designed to receive, at its upper end, successive analogue pulses of electric potential. The conductive material $112_1 \ldots 112_N$ has a non-zero capacitor $C_1 \ldots C_N$ with the electrical ground, formed in this case from the silicon substrate 102. This capacitor $C_1 \ldots C_N$ is shown as a dotted line in FIG. 1. So, the conductive material $112_1 \ldots 112_N$ has a voltage $V_1 \ldots V_N$ that increases with each pulse received, in such a way that the accumulation vertical interconnection $110_1 \ldots 110_N$ is designed to accumulate the values of the pulses received in a recorded value, referred to as accumulation value, i.e. the voltage $V_1 \ldots V_N$. Furthermore, due to the presence of a leakage current between the conductive material $112_1 \ldots 112_N$ and the electrical ground, the voltage $V_1 \ldots V_N$ decreases over the course of time, in such a way that the accumulation vertical interconnection $110_1 \ldots 110_N$ is designed to decrease the accumulation value over the course of time.

Each of the neurons $108_1 \ldots 108_N$ then comprises an electronic circuit, referred to as discharger $114_1 \ldots 114_N$, for the emission of pulses by the neuron $108_1 \ldots 108_N$.

Each discharger $114_1 \ldots 114_N$ comprises first of all a comparator $116_1 \ldots 116_N$ designed to emit a pulse, referred to as discharge pulse, according to the accumulation value. More precisely, each comparator $116_1 \ldots 116_N$ is first of all designed to compare the accumulation value with a predetermined threshold (a voltage $V_S$ in the case described), identical for all of the neurons. To this effect, the voltage $V_S$ is supplied to each comparator $116_1 \ldots 116_N$. Each comparator $116_1 \ldots 116_N$ is then designed to emit a discharge pulse in the form of a pulse of constant electric potential when the accumulation value exceeds the predetermined threshold.

Due to the electrical noise in the silicon substrate 102, it is possible for the electric potential of the electrical ground on the accumulation vertical interconnection $110_1 \ldots 110_N$ to vary in relation to the potential of the electrical ground used by means (not shown) used to generate the voltage $V_S$, which risks distorting the comparison with the voltage $V_S$. In order to minimise the influence of the electrical noise of the silicon substrate 102, each discharger $114_1 \ldots 114_N$ further comprises a reference vertical interconnection $117_1 \ldots 117_N$. The reference vertical interconnection $117_1 \ldots 117_N$ is polarised at a potential $V_{bias}$ supplied by the means mentioned hereinabove, and supplies the potential $V_s$ to the comparator. The reference vertical interconnection $117_1 \ldots 117_N$ is located in the vicinity of the accumulation vertical interconnection $110_1 \ldots 110_N$ of the neuron $108_1 \ldots 108_N$ under consideration, more preferably less than 100 micrometers from the accumulation vertical interconnection $110_1 \ldots 110_N$ of the neuron $108_1 \ldots 108_N$ under consideration. So, the reference interconnection $117_1 \ldots 117_N$ offsets the ground variations which the accumulation vertical interconnection $110_1 \ldots 110_N$ and the comparator $116_1 \ldots 116_N$ can be subjected to.

Each discharger $114_1 \ldots 114_N$ then comprises an initialisation electronic circuit $118_1 \ldots 118_N$, designed to reinitialise the accumulation value to a certain value, at each emission of a discharge pulse. In the device described, each initialisation electronic circuit $118_1 \ldots 118_N$ comprises a switch $120_1 \ldots 120_N$ connecting the conductive material $112_1 \ldots 112_N$ to the electrical ground, with the switch $120_1 \ldots 120_N$ being controlled in its closed position by the discharge pulse, in such a way as to initialise the voltage $V_1 \ldots V_N$ to zero potential (potential of the electrical ground) at each emission of a discharge pulse.

The dischargers $114_1 \ldots 114_N$ are carried by the bottom surface 106.

The data processing device 100 then comprises another electronic circuit, referred to as pulse propagator 122, in order to manage the pulses to be sent to or coming from neurons $108_1 \ldots 108_N$.

The pulse propagator 122 comprises first of all an electronic circuit, referred to as encoder 124, designed to encode the discharge pulses emitted by the neurons $108_1 \ldots 108_N$ into digital discharge pulses in such a way that each digital pulse comprises a series of binary values representing an identifier (referred to in what follows as "address") of the neuron $108_1 \ldots 108_N$ that has emitted the discharge pulse (referred to in what follows as "source neuron"). In the device described, the encoder 124 comprises a basic encoder $126_1 \ldots 126_N$ for each neuron $108_1 \ldots 108_N$. The basic encoders $126_1 \ldots 126_N$ are carried by the bottom surface 106.

The pulse propagator 122 further comprises a controller 128 in order to generate and emit digital pulses, referred to as propagated digital pulses, each intended to be transmitted to one of the respective neurons, referred to as destination neuron. In the device described, the controller 128 comprises a memory 130 wherein are recorded computer programme instructions 131, and a central processing unit 133 designed to execute computer programme instructions 131 in order to carry out the functions described hereinafter, as well as the steps described in what follows, in reference to FIG. 3. So, the controller 128 is first of all designed to generate at least one propagated digital pulse using input data E. The controller 128 is furthermore designed to receive the digital discharge pulses coming from neurons $108_1 \ldots 108_N$ and to determine, for each of them, the source neuron using the address indicated in the digital discharge pulse. Furthermore, for each digital discharge pulse, the controller 128 is furthermore designed to, according to the source neuron, either emit output data S of the device using the discharge pulse, or convert the digital discharge pulse into at least one propagated digital pulse. In order to determine the destination neuron or neurons of the propagated digital pulse, a table of correspondence 135, also referred to as "Look-Up Table" or LUT, is recorded in the memory 130. This table of correspondence 135 defines, according to the address of the source neuron, the address(es) of the destination neuron or neurons. The table of correspondence 135 furthermore defines the values of the propagated pulses (also referred to as "weights" in the field of neural networks).

The weights are generally determined by calculation or during a learning phase, during which input data, associated with known output data, is supplied to the processing device 100, with the weights then being determined so that the processing device 100 supplies the known output data.

The controller 128 is carried by the top surface 104.

The pulse propagator 122 further comprises a digital-to-analogue converter 132 in order to convert each propagated digital pulse emitted by the controller 128 into propagated analogue pulse having as amplitude the value determined using the table of correspondence 135, as well as a switch 134 controlled by the controller 128 in order to direct the propagated analogue pulse to the corresponding destination neuron or neurons. The digital-to-analogue converter 132 and the switch 134 are carried by the top surface 104.

The processing device 100 further comprises connections 136 extending over the top surface 104 and connecting the switch 134 to the upper end of the accumulation vertical interconnection $110_1 \ldots 110_N$ of each neuron $108_1 \ldots 108_N$.

As the pulse propagator 122 comprises a portion located on the top surface 104 (i.e. the controller 128, the digital-to-analogue converter 132 and the switch 134), while the discharger $114_1 \ldots 114_N$ of each neuron $108_1 \ldots 108_N$ is located on the bottom surface 106, it is necessary to allow for a communication of data representing the discharge pulses from the bottom surface 106 to the top surface 104. To this effect, the pulse propagator 122 comprises at least one vertical interconnection 140 provided to transmit this data representing the discharge pulses from the bottom surface 106 to the top surface 104. Furthermore, the pulse propagator 122 comprises a data bus 142 connecting the basic encoders $126_1 \ldots 126_N$ to the lower end (that on the side of the bottom surface 106) of the vertical interconnection 140 of the pulse propagator 122. The data bus 142 extends over the bottom surface 106 of the silicon substrate 102. Furthermore, the pulse propagator 122 comprises a connection 143 connecting the upper end (that of the side of the top surface 104) of the vertical interconnection 140 of the pulse propagator 122 to the controller 128.

Moreover, more preferably, the vertical interconnection or interconnections 140 of the pulse propagator 122, the accumulation vertical interconnections $110_1 \ldots 110_N$ and the reference vertical interconnections $117_1 \ldots 117_N$ of the neurons $108_1 \ldots 108_N$ are manufactured according to the same method of manufacture, and are therefore identical. This greatly simplifies the manufacture of the data processing device 100. More preferably, the method described in the publication: "Development and characterisation of high electrical performances TSV for 3D applications", by Henry D., Cheramy S., Charbonnier J., Chausse P., Neyret M., Garnier G., Brunet-Manquat C., Verrun S., Sillon N., Bonnot L., Farcy A., Cadix L., Rousseau M. and Saugier E., in: "Electronics Packaging Technology Conference, 2009. EPTC '09", 11th vol., pp. 528-535, 9-11 Dec. 2009 doi: 10.1109/EPTC.2009.5416490.

This method comprises in summary a step of deep engraving of the silicon substrate, a step of depositing an insulating material and a step of depositing a conductive material, for example made of metal.

More preferably, the method of manufacture makes it possible to obtain a predefined capacitor value with an uncertainty of 10% or more. This makes it possible to use a simple, and therefore inexpensive, method of manufacture. Generally, such uncertainty would not be tolerated for an analogue electronic circuit. However, as explained previously, the very structure of a neuron network accommodates this.

Figure 2:
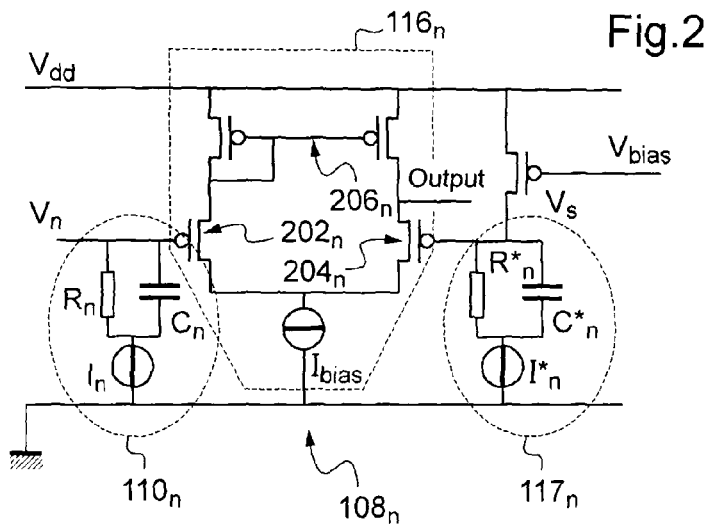
FIG. 2 shows an equivalent electrical diagram of a neuron of the data processing device of FIG. 1.

In reference to FIG. 2 which shows an example of an equivalent electrical diagram, one of the neurons $108_1 \ldots 108_N$ is shown and bears the reference $108_n$, with the index n being between 1 and N. The elements of this neuron $108_n$ also carry the index "n".

The accumulation vertical interconnection $110_n$ of the neuron $108_n$ is modelled by a resistor $R_n$ and the capacitor $C_n$ in parallel, a first terminal of these two elements having the voltage $V_n$ and the other terminal of these two elements being connected to the electrical ground by a source of current $I_n$.

The comparator $116_n$ of the neuron $108_n$ comprises first of all an input field effect transistor $202_n$, the gate of which is connected to the accumulation vertical interconnection $110_n$ in order to receive the voltage $V_n$.

The comparator $116_n$ further comprises an output field effect transistor $204_n$, the gate of which is connected to the reference vertical interconnection $117_n$ in order to receive the voltage $V_S$.

The comparator $116_n$ further comprises a "current mirror" mounting $206_n$ based on field effect transistors (known per se), said mounting being powered by a voltage $V_{dd}$ and connected to one among the source and the drain of the input and output field effect transistors $202_n$, $204_n$.

The comparator $116_n$ further comprises a source of current $I_{bias}$ connecting to the electrical ground the other among the source and the drain of the input and output field effect transistors $202_n$, $204_n$.

The reference vertical interconnection $117_n$ is modelled by a resistor $R^*_n$ and a capacitor $C^*_n$ in parallel, with a first terminal of these two elements receiving the voltage $V_S$ and the other terminal of these two elements being connected to the electrical ground by a source of current $I^*_n$.

The other neurons are identical to the neuron $108_n$.

Figure 3:
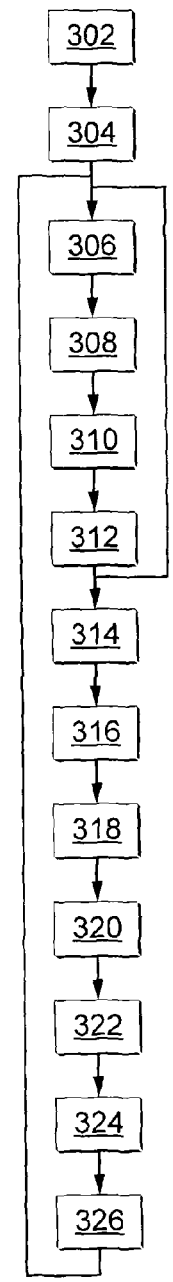
FIG. 3 shows the successive steps of a neuromorphic method for data processing implementing the invention carried out by the neuromorphic data processing device of FIG. 1, and FIGS. 4 and 5 are simplified cross-section views of alternatives of the integrator of the neuromorphic data processing device of FIG. 1.

In reference to FIG. 3, a data processing method 300 implemented by the device of FIG. 1 comprises the following steps.

During a step 302, the controller 128 receives input data.

During a step 304, the controller 128 determines at least one destination neuron and the value of the propagated digital pulse or pulses to emit to the destination of this neuron or neurons.

For each propagated digital pulse determined, the following steps 306 to 312 are carried out.

During a step 306, the controller 128 emits the propagated digital pulse to the digital-to-analogue converter 132.

During a step 308, the controller 128 converts the propagated digital pulse into a propagated analogue pulse and emits it to the switch 134.

During a step 310, the controller 128 controls the switch 134 in order to configure the latter to emit the propagated analogue pulse to the corresponding destination neuron.

During a step 312, the switch 134 emits the propagated analogue pulse to the corresponding destination neuron.

During a step 314, the propagated pulse or pulses are accumulated in the integrator $109_1 \ldots 109_N$ of the destination neurons.

During a step 316, the discharger $114_1 \ldots 114_N$ of one or several neurons determines that the accumulated value exceeds the threshold value.

Consequently, the discharger emits, during a step 318, a constant potential discharge pulse and, during a step 320, reinitialises the accumulated value.

During a step 322, the encoder 124 converts the discharge pulses of constant potential into digital discharge pulses including the address of the source neuron.

During a step 324, the digital discharge pulses are conveyed by the data bus 142 and the vertical interconnection 140 to the controller 128.

During a step 326, the controller 128 converts, according to their source address, the digital discharge pulses either into output data S of the device or into propagated pulses. In the latter case, the controller determines the value of the propagated pulses and the destination neurons using the table of correspondence 135. The value of the pulses is obtained using the weight indicated in the table of correspondence 135.

The method then returns to steps 306 to 312.

In reference to FIG. 4, each integrator $109_n$ (with the index n varying between 1 and N) comprises alternatively two accumulation vertical interconnections $402_n$, $404_n$ mounted in series, i.e. their lower ends are connected by a metallisation $406_n$ on the lower surface of the silicon substrate, while the pulses are received by the upper end of the first accumulation vertical interconnection $402_n$ and that the upper end of the other accumulation vertical interconnection $404_n$ is connected to the discharger in order to provide it with voltage $V_n$. This solution makes it possible to retain the two portions that constitute the neuron circuit on the same integrated circuit (the same surface of the silicon substrate). In this case, a 3D architecture, i.e. over at least two surfaces of the silicon support, is not required. The accumulation vertical interconnections $402_n$, $404_n$ are thus used only for their capacitive effect, not for passing from one surface of the silicon substrate to the other.

In reference to FIG. 5, each integrator $109_n$ (with the index n varying between 1 and N) comprises alternatively two accumulation vertical interconnections $502_n$, $504_n$ mounted in parallel, i.e. their upper and lower ends are connected together by metallisations $506_n$, $508_n$. This solution makes it possible to have a larger capacitor, and therefore to have integration capacitances with a higher time constant.

It appears clearly that a data processing device and a method for data processing such as those described previously make it possible to reduce the size of the data processing device.

The invention is not limited to the embodiment described previously and it shall appear to those skilled in the art that diverse modifications can be made to it, in light of the information which has just been disclosed.

In particular, the neurons could be distributed between the top surface and the bottom surface (even over more than two planes).

In this case, a vertical interconnection similar to the vertical interconnection 140 can be provided to convey the propagated analogue pulses emitted by the pulse propagator to the lower surface, where they are received by the accumulation vertical interconnections of the neurons carried by the upper surface.

Furthermore, the neurons could be connected directly together without making use of the AER solution described previously.

Furthermore, the controller 128 could be replaced with a connection matrix, referred to as a "crossbar", which does not comprise a processing unit executing a computer programme.

In the claims which follow, the terms used must not be interpreted as limiting the claims to the embodiment exposed in this description, but must be interpreted to include therein all of the equivalents that the claims aim to cover due to their formulation and the provision of which is within the scope of those skilled in the art when applying the general knowledge to the implementation of the information which has just been disclosed.

The invention claimed is:

1. A neuromorphic data processing device, comprising:
 a plurality of spiking neurons, each said spiking neuron including:
 an integrator configured to:
  receive successive analog pulses, each having a certain value, and
  accumulate the certain values of the received analog pulses in a recorded value, referred to as an accumulation value;
 a discharger configured to:
  emit a pulse, referred to as a discharge pulse, according to the accumulation value; and
 a silicon support having two surfaces,
 wherein a portion of each of the spiking neurons is provided on at least one of the two surfaces,
 wherein the integrator of each said spiking neuron has a metal Through-Silicon Via (TSV) between the two surfaces of the silicon support, the metal TSV forming a capacitor with the silicon support and having an electric potential forming the accumulation value,
 wherein the certain values of the received analog pulses are accumulated in the accumulation value, and
 wherein the discharge pulse is emitted according to the accumulation value.

2. The neuromorphic data processing device according to claim 1, further comprising a pulse propagator configured to:
 emit the analog pulses to at least one of the spiking neurons using input data, and
 receive the respective discharge pulses, and, for each said discharge pulse received, according to the spiking neuron that has emitted it:
 either emit output data using said discharge pulse,
 or convert said discharge pulse into at least one analog pulse, referred to as a propagated analog pulse, and emit each said propagated analog pulse to a corresponding one of the spiking neurons.

3. The neuromorphic data processing device according to claim 2,
 wherein the pulse propagator includes at least one portion located on a first of the two surfaces, referred to as a top surface,
 wherein the discharger of each said spiking neuron is located on the other of the two surfaces, referred to as a bottom surface, and
 wherein the neuromorphic data processing device further comprises:
 connections extending over the top surface and connecting the at least one portion of the pulse propagator to the metal TSV of each said spiking neuron; and
 connections extending over the bottom surface and connecting the metal TSV of each said spiking neuron to the discharger of said spiking neuron.

4. The neuromorphic data processing device according to claim 2, wherein the pulse propagator includes at least one metal TSV to transmit information from a bottom surface to a top surface of the propagator.

5. The neuromorphic data processing device according to claim 4, wherein the at least one metal TSV of the pulse propagator, as well as the metal TSVs of the spiking neurons are manufactured according to a same method of manufacture.

6. The neuromorphic data processing device according to claim 4, wherein the pulse propagator further includes:
   an encoder configured to encode the discharge pulses into digital discharge pulses such that each said digital discharge pulse represents an identifier of the spiking neuron that has emitted the discharge pulse, and
   a data bus connecting the encoder to the metal TSV of the pulse propagator.

7. The neuromorphic data processing device according to claim 1, wherein the integrator of each said spiking neuron is configured to decrease the accumulation value over time.

8. The neuromorphic data processing device according to claim 1, wherein the discharger of each said spiking neuron is configured to reinitialize the accumulation value to a certain value at each discharge pulse emission.

9. The neuromorphic data processing device according to claim 1, wherein the discharge pulses are constant potential pulses.

10. The neuromorphic data processing device according to claim 1, wherein each said discharger includes:
    a comparator to compare the accumulation value with a reference value, and
    a reference metal TSV configured to offset any ground variations that the metal TSV and the comparator are subjected to.

11. A method for neuromorphic data processing, comprising:
    receiving successive analog pulses, each having a certain value,
    accumulating the certain values of the received analog pulses in a recorded value, referred to as an accumulation value, and
    emitting a pulse, referred to as a discharge pulse, according to the accumulation value,
    wherein the successive analog pulses are received and accumulated in a metal Through-Silicon Via (TSV) between two surfaces of a silicon support, the metal TSV forming a capacitor with the silicon support and having an electric potential forming the accumulation value,
    wherein the certain values of the received analog pulses are recorded in the accumulation value, and
    wherein the discharge pulse is emitted according to the accumulation value.

\* \* \* \* \*

UNITED STATES PATENT AND TRADEMARK OFFICE
CERTIFICATE OF CORRECTION

| | |
|---|---|
| PATENT NO. | : 8,909,577 B2 |
| APPLICATION NO. | : 13/549990 |
| DATED | : December 9, 2014 |
| INVENTOR(S) | : Rodolphe Heliot et al. |

It is certified that error appears in the above-identified patent and that said Letters Patent is hereby corrected as shown below:

On the title page, Item (73), the Assignee's Information is incorrect. Item (73) should read:

--(73) Assignee: Commissariat à l'énergie atomique et aux énergies alternatives, Paris (FR)--

Signed and Sealed this
Thirty-first Day of March, 2015

Michelle K. Lee
*Director of the United States Patent and Trademark Office*